US009880644B2

(12) United States Patent
Seong et al.

(10) Patent No.: US 9,880,644 B2
(45) Date of Patent: Jan. 30, 2018

(54) COMPUTER INPUT APPARATUS AND METHOD USING SMART TERMINAL WITH ELECTRONIC PEN

(71) Applicant: Samsung Electronics Co., Ltd., Gyeonggi-do (KR)

(72) Inventors: Sangmin Seong, Gyeonggi-do (KR); Eunseok Kim, Busan (KR); Junhong Kim, Busan (KR); Taejune Park, Busan (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/329,505

(22) Filed: Jul. 11, 2014

(65) Prior Publication Data

US 2015/0015550 A1   Jan. 15, 2015

(30) Foreign Application Priority Data

Jul. 11, 2013   (KR) ........................ 10-2013-0081368

(51) Int. Cl.
*G06F 3/033* (2013.01)
*G06F 3/0354* (2013.01)
*G06F 1/16* (2006.01)
*G06F 3/0488* (2013.01)

(52) U.S. Cl.
CPC ........ *G06F 3/03545* (2013.01); *G06F 1/1626* (2013.01); *G06F 3/04883* (2013.01); *G06F 3/04886* (2013.01); *G06F 2203/04807* (2013.01)

(58) Field of Classification Search
CPC .. G06F 3/03545; G06F 3/04883; G06F 3/033; G06F 3/0488; G06F 3/041; G06F 3/0416; G06F 3/0414; G06F 3/04886; G06F 1/1626; G06F 2203/04807; G06T 11/2013
See application file for complete search history.

(56) References Cited

U.S. PATENT DOCUMENTS

| | | | | |
|---|---|---|---|---|
| 5,995,081 A | * | 11/1999 | Kato | 345/156 |
| 6,906,703 B2 | * | 6/2005 | Vablais et al. | 345/179 |
| 7,397,469 B2 | * | 7/2008 | Vablais et al. | 345/179 |
| 8,681,129 B2 | * | 3/2014 | Kompalli et al. | 345/179 |
| 8,994,698 B2 | * | 3/2015 | DiVerdi et al. | 345/179 |
| 9,046,940 B2 | * | 6/2015 | Oyama | |
| 2002/0181744 A1 | * | 12/2002 | Vablais et al. | 382/107 |
| 2005/0243656 A1 | * | 11/2005 | Vablais et al. | 368/121 |
| 2007/0139399 A1 | * | 6/2007 | Cook | 345/179 |
| 2009/0120694 A1 | * | 5/2009 | Kompalli et al. | 178/18.03 |

(Continued)

*Primary Examiner* — Peter D McLoone
(74) *Attorney, Agent, or Firm* — The Farrell Law Firm, P.C.

(57) ABSTRACT

A computer input system is provided for using a smart terminal as an input device to a computer. The method for the computer includes receiving from the smart terminal, input to the smart terminal from an electronic pen, wherein the input is received by the computer through a predetermined communication mode established between the computer and the smart terminal, identifying a foreground application of the computer, interpreting the input in association with the foreground application, converting the interpreted input to an input signal associated with the foreground application, and controlling the foreground application with the input signal, to execute an operation corresponding to the input signal, where the input signal is a keyboard or mouse input signal.

3 Claims, 19 Drawing Sheets

(56) References Cited

U.S. PATENT DOCUMENTS

| | | | |
|---|---|---|---|
| 2010/0265214 A1* | 10/2010 | Green et al. | 345/174 |
| 2011/0248941 A1* | 10/2011 | Abdo et al. | 345/173 |
| 2012/0313865 A1* | 12/2012 | Pearce | G06F 3/0416 |
| | | | 345/173 |
| 2013/0107144 A1* | 5/2013 | Marhefka et al. | 349/12 |
| 2013/0229389 A1* | 9/2013 | DiVerdi et al. | 345/179 |
| 2014/0019070 A1* | 1/2014 | Dietz et al. | 702/41 |
| 2014/0043547 A1* | 2/2014 | Marhefka | 349/12 |
| 2014/0062968 A1* | 3/2014 | Skinner | 345/179 |
| 2014/0085257 A1* | 3/2014 | Wright et al. | 345/174 |
| 2014/0118312 A1* | 5/2014 | Oyama | 345/179 |
| 2014/0173531 A1* | 6/2014 | Zou et al. | 715/863 |
| 2014/0198080 A1* | 7/2014 | Mankowski et al. | 345/179 |
| 2014/0253522 A1* | 9/2014 | Cueto | 345/179 |
| 2015/0022468 A1* | 1/2015 | Cha et al. | 345/173 |
| 2015/0062021 A1* | 3/2015 | Skaljak et al. | 345/173 |
| 2015/0116289 A1* | 4/2015 | Stern et al. | 345/179 |
| 2015/0123932 A1* | 5/2015 | Collins | 345/174 |

* cited by examiner

COMPUTER INPUT APPARATUS AND METHOD USING SMART TERMINAL WITH ELECTRONIC PEN

PRIORITY

This application claims priority under 35 U.S.C. §119(a) to a Korean Patent Application, which was filed on Jul. 11, 2013 in the Korean Intellectual Property Office and assigned Serial No. 10-2013-0081368, the entire content of which is incorporated herein by reference.

BACKGROUND OF THE INVENTION

1. Field of the Invention

The present invention relates generally to a computer input apparatus and method and, more particularly, to an apparatus and method for providing input to the computer using a smart terminal operating with an electronic pen.

2. Description of Related Art

Computers have become important electronic devices in our life. Many people use the computer for entertainment (such as shopping and watching movies, dramas, and sports) as well as for working in the office.

As the computer has become a part of everyday life, various types of computer input devices have been developed. Examples of input devices include a keyboard, a corded mouse, a cordless mouse, a joystick for game, a touchpad and touch panel, a tablet pad, and a smart terminal.

Recently, the smart terminal has emerged as the primary computing device at a speed overwhelming the computer. The smart terminal is mainly designed in the formats of smartphone and tablet computer. Typically, smart terminals support at least one radio communication standard.

For example, a smart terminal is capable of connecting to a Wi-Fi network and a cellular communication network such as 3rd Generation (3G) and Long Term Evolution (LTE) systems. With the capability of connecting to various communication networks, the smart terminal is capable of processing various computer-oriented functions. For example, recent smart terminals are capable of processing most computer-oriented operations such as document work, emailing, and entertainment activities (e.g. shopping and watching movies, dramas, and sports).

Furthermore, certain smart terminals equipped with a touch panel are capable of receiving a user input by means of a pen, thereby facilitating the computer-oriented tasks. This means that the smart terminal input is made in a similar way to tablet-based input to the computer.

However, professional tasks requiring, for example, the sophisticated skills of an advanced designer to perform tasks such as drawing a picture and using an illustration program, still rely on the use of the computer. This is because the smart terminal is constrained in processing speed, screen size, and storage space.

There is therefore a need for a method capable of using various input mechanisms of the smart terminal for input to the computer so as to utilize the superior capabilities of the computer through interoperation between the computer and the smart terminal.

SUMMARY

The present invention has been made to address at least the problems and disadvantages described above, and to provide at least the advantages described below.

Accordingly, an aspect of the present invention is to provide a computer input system and a method of using a smart terminal as an input device of a computer.

In accordance with an aspect of the present invention, a method of a computer for using a smart terminal as an input device is provided. The method includes receiving from the smart terminal, input to the smart terminal from an electronic pen, wherein the input is received by the computer through a predetermined communication mode established between the computer and the smart terminal, identifying a foreground application of the computer, interpreting the input in association with the foreground application, converting the interpreted input to an input signal associated with the foreground application, and controlling the foreground application with the input signal, to execute an operation corresponding to the input signal, where the input signal is a keyboard or mouse input signal.

In accordance with another aspect of the present invention, a method of a smart terminal used as an input device to a computer is provided. The method includes receiving information on a foreground application of the computer from the computer, receiving an input made with an electronic pen and transmitting the input to the computer through a predetermined communication mode established between the computer and the smart terminal.

In accordance with another aspect of the present invention, a computer input system using a smart terminal as an input device to a computer is provided. The system includes a smart terminal configured to receive input from an electronic pen and a computer configured to receive the input transmitted by the smart terminal to the computer through a predetermined communication mode established with the smart terminal and to process the received input. The smart terminal includes an operating system configured to operate the smart terminal and provides a basis for application processes, a process check module configured to receive information on a foreground application of the computer and provide a user with the information in association with the foreground application, a mode configuration module configured to set an operation mode of the smart terminal based on the information received by the process check module and provide the computer with the information on the operation mode, and an electronic pen input development module configured to convert the input made with the electronic pen to an input signal which can be processed by the smart terminal: The computer includes a smart terminal server module configured to receive information transmitted by the smart terminal and distribute the information by means of the operation system of the smart terminal, a process monitor module configured to identify the foreground application of the computer, an interpreter module configured to interpret the information received from the smart terminal corresponding to the foreground application, and an application program development module configured to convert the information interpreted by the interpreter module to the information for use in the foreground application.

BRIEF DESCRIPTION OF THE DRAWINGS

The above and other aspects, features and advantages of the present invention will be apparent from the following detailed description, taken in conjunction with the accompanying drawings, in which.

DETAILED DESCRIPTION OF EMBODIMENTS OF THE PRESENT INVENTION

Figure 1:
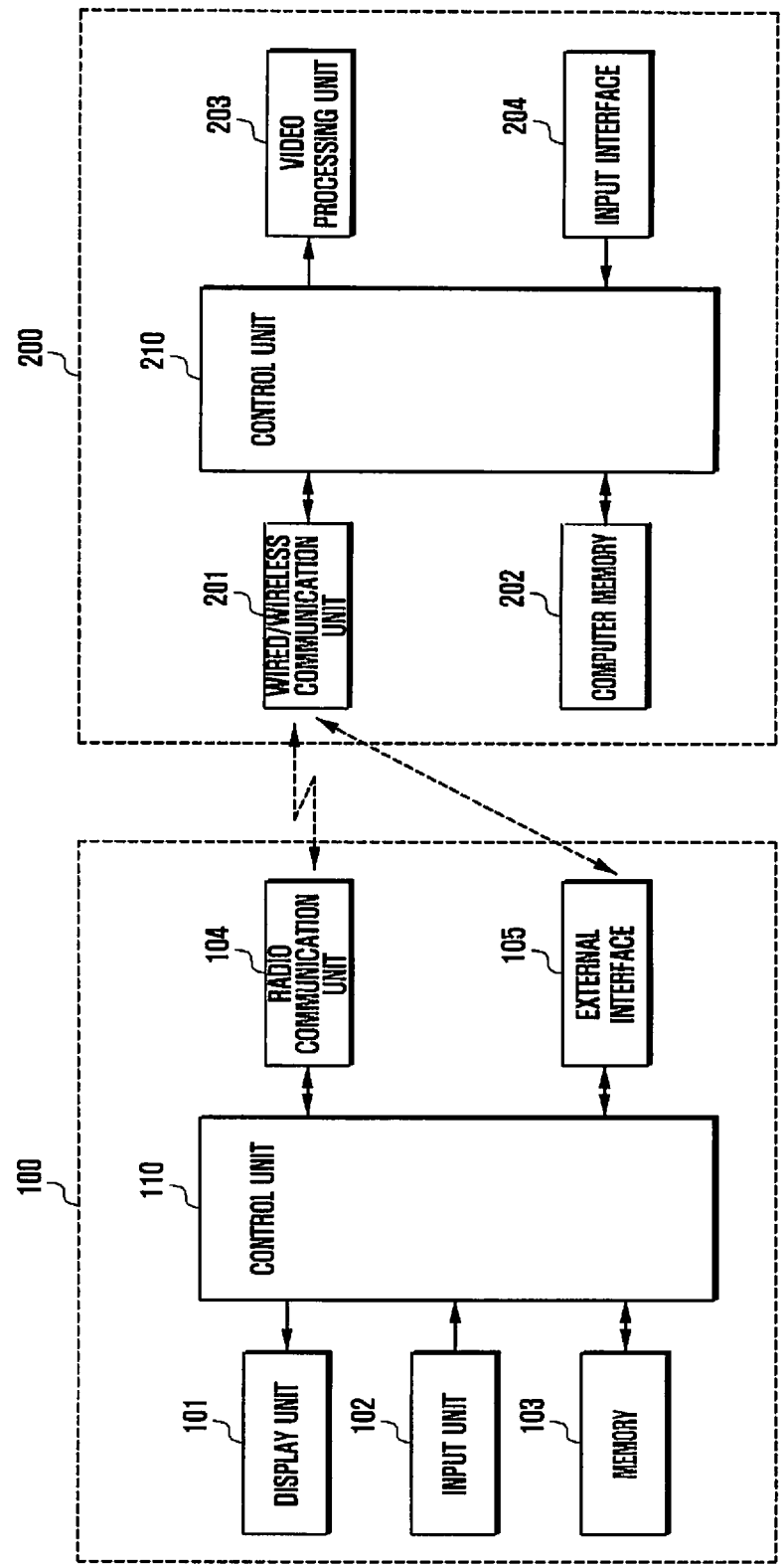
FIG. 1 is a block diagram illustrating a computer input system comprised of a computer and a smart terminal operating as an input device of the computer, according to an embodiment of the present invention.

Embodiments of the present invention are described with reference to the accompanying drawings in detail. The accompanying drawings are presented to help understand the present invention, and the present invention is not limited to the shapes and arrangements of the components provided in the drawings. The equivalents or modifications of the embodiments on the accompanying drawings of the present invention should be more readily understood by reference to the detailed description.

FIG. 1 is a block diagram illustrating a computer input system comprised of a computer and a smart terminal as an input device of the computer, according to an embodiment of the present invention.

The smart terminal 100 and the computer 200 communicate data through a wired or wireless network. Here, the smart terminal denotes a terminal capable of receiving touch input made with an electronic pen 500 and or fingers.

The computer input system includes the smart terminal 100 and the computer 200. Accordingly, the smart terminal 100 operates on a mobile Operating System (OS), and the computer 200 operates on a computer OS. Examples of the OS include Android, iOS, Windows, Linux, Symbian, Tizen, Bada, etc.

Typically, the OS of the smart terminal 100 may be Android, and the OS of the computer 200 may be Windows.

The smart terminal 100 includes a display unit 101, an input unit 102, a memory 103, a radio communication unit 104, an external interface 105, and a control unit 110. Although the smart terminal 100 may include other components in addition to those depicted in FIG. 1, the components not related to the description provided herein for various embodiments of the present invention are omitted.

The display unit 101 may be implemented with any of a Liquid Crystal Display (LCD), Light Emitting Diodes (LED), and Organic LED (OLED) and displays configuration and/or operation states of the smart terminal 100 to the user under the control of the control unit 110. The input unit 102 detects a user input and generates a corresponding input signal to the control unit 110. The input unit 102 includes a key input device for detecting key input made by the user, a touch input device for detecting a touch input, and an electronic pen input detection device for detecting the input made with the electronic pen 500. The touch input device and the electronic pen input device checks the coordinates at the position where a touch made with the finger or the electronic pen 500 is detected. Also, the electronic pen input device of the input unit 102 is capable of detecting the pressure of the touch made with the electronic pen 500. The information generated by the input unit 102 is provided to the control unit 110.

The memory 103 may include Read Only Memory (ROM) and/or Random Access Memory (RAM) and is provided with regions for storing the OS of the smart terminal and various control data concerning the operations of the smart terminal and the user data. The memory 103 includes a region for storing the control data concerning the case where the smart terminal operates as an input device of the computer.

The radio communication unit 104 includes a communication module for communication with the computer in a predetermined communication mode such as WI-FI and Bluetooth mode. The radio communication unit 104 processes the data from the control unit 110 to generate a signal to the computer and processes the signal received from the computer 200 in the communication mode to generate the data to the control unit 100.

The radio communication unit 104 further includes a communication module for communication through a cellular communication system such as 3G and/or LTE system in addition to the module for communication with the computer 200. The cellular communication module, included in the radio communication unit 104, further performs the operations concerning data communication through the cellular communication network. At this time, the radio communication unit 104 may include a vocoder for processing voice signal in voice communication mode, a microphone, and a speaker.

The external interface 105 provides a wired connection interface for data communication with an external device such as the computer 200. Accordingly, the external interface 105 processes the data from the control unit 110 for output to an external device and processes the data received from the external device for input to the control unit 110.

The control unit 110 controls overall operations of the smart terminal and, particularly, the operation of the smart terminal 100 as an input device of the computer 200. The operations of the control unit 110 are described below in more detail.

The computer 200 includes a wired/wireless communication unit 201, a computer memory 202, a video processing unit 203, an input interface 204, and a control unit 210. Although the computer 200 may further include other components in addition to those shown in FIG. 1, only the basic components related to the description provided herein for various embodiments of the present invention are depicted.

The wired/wireless communication unit 201 communicates with a wired network and performs data communication with the radio communication unit 104 and/or the external interface 105 of the smart terminal 100. The communication between the wired/wireless communication unit 201 and the smart terminal 100 is described below in detail with reference to accompanying drawings.

The memory 202 includes storage media such as hard disc, ROM, RAM, Compact Disc (CD), and/or Digital Video Disk (DVD), and is capable of storing the computer OS, various application programs, and user data. The memory 202 stores the control data for use of the smart terminal 100 as an input device and includes a region for storing the data generated by the smart terminal 100 as the input device and the data designated by the user.

The video processing unit 203 processes the operation state of the application programs running on the computer and the user input data from the control unit 210 to generate the data as visual information to a display such as a monitor.

The input interface 204 supports connection of various user input devices such as a keyboard, a mouse, a tablet panel, and a joystick, and receives the signals from the input devices to the control unit 210.

The control unit 210 controls overall operations of the computer and processes the data received from the smart device 100 operating as the input device to generate the input data to the video processing unit 203.

Figure 2:
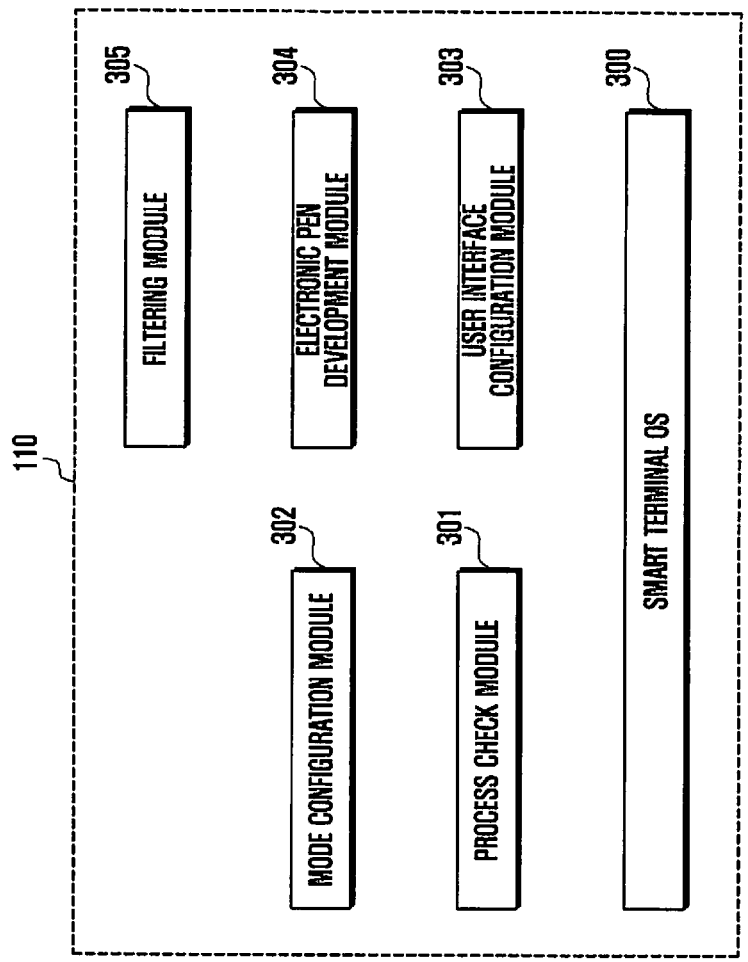
FIG. 2 is a block diagram illustrating a configuration of a control unit of a smart terminal operating as an input device of a computer, according to an embodiment of the present invention.

FIG. 2 is a block diagram illustrating a configuration of a control unit of a smart terminal operating as an input device of the computer, according to an embodiment of the present invention.

Referring to FIG. 2, an application of the smart terminal 100 receives a value input by the user and sends the input value to the computer 200 through a filter. The smart terminal 100 then checks the foreground application of the computer 200 and determines its operation mode.

The control unit 110 of the smart terminal 100 operates the individual modules on the smart terminal OS 300. For example, if the OS 300 of the smart terminal 100 is Android, the modules operate on the Android OS. It should be note that the modules are configured for the case when the smart terminal 100 operates as the input device of the computer 200.

The process check module 301 determines the operation mode based on the foreground application checked through the process monitor of the computer 200 to provide the user with the operation mode. Here, the foreground application is the process running with priority when two or more processes or applications are running in the computer. If, for example, a word processor application and a picture edit application are running in the computer 200, one of the two applications operates on the foreground. That is, the applications running on the OS are classified into foreground applications and background applications. Typically, the foreground application or process operates with its execution object presented on the entire screen.

The information on the operation mode is transmitted to the computer 200 via the mode configuration mode 302. The process check module 301 checks the current operation mode of the smart terminal 100 and the foreground application of the computer 200 based on the information received through the mode configuration module 302.

The user interface configuration module 303 is a module for configuring the user interface configuration mode, i.e. pen input mode, of the smart terminal 100. In the case of using the pen as an input tool, the pen may be configured in either left hand grip mode or right hand grip mode. For example, the right hand grip mode is a mode used for holding the pen with the right hand such that a button is arranged at the left side of the pen for use by both hands efficiently. The grip modes may be switched by touching the screen. The grip mode switching operation is described below in more detail with reference to FIGS. 4A and 4B.

The user interface configuration module 303 further differentiates between the operation of the graphics applications, i.e. image-editing applications, and the operation of the non-graphics applications in the way in which it processes a certain operation to be fit for the graphics application. An example of a graphics application includes ADOBE PHOTOSHOP.

The electronic pen input development module 304 refers to an open development tool for facilitating the use of the electronic pen 500 with a terminal capable of receiving electronic pen input. That is, the electronic pen input development module 304 is a library provided for facilitating development of drawing application programs using the electronic pen 500. For example, the electronic pen input development module 304 may be the electronic pen input development module used in Samsung Electronics such as JAVA library.

In the following, the description is made under the assumption that the electronic pen input development module 304 is the electronic pen input development module used in Samsung Electronics. Although the description is directed to a specific electronic pen input development module in the present invention, it is obvious to those skilled in the art that the computer input system may be embodied with various types of electronic pen input development modules.

In the scenario where the electronic pen 500, designed for the smart terminal 100, is used as the input device of the computer 200, the variables and modules necessary for implementing the input device in the electronic pen input development module 304 may be exemplified as follows:

(1) CanvasView extends view: Inherit class and Android View associated with drawing
(2) static int ERASER_MODE: Identifier (ID) value indicating eraser mode
(3) static int METASTATE_ERASER: ID value of MetaState occurring in response to touch eraser
(4) static int METASTATE_HAND: ID value of MetaState occurring in response to hand touch
(5) static int METASTATE_MAX: Maximum number of IDs of Meta-State (6) static int METASTATE_PEN: ID value of Meta-State occurring in response to pen touch
(7) static int PEN_MODE: ID value indicating pen mode
(8) static int SELECT_MODE: ID value indicating selection mode
(9) static int TEXT_MODE: ID value indicating text mode
(10) voID addTouchEvent(int what, float x, float y, float pressure, int meta_state, long down_time, long event_time): Function inputting drawing coordinates
(11) voID changeModeTo (int mode): Switch current mode to another mode (the value available for the value at (11) may include one of PEN_MODE, ERASER_MODE, SELECT_MODE, and TEXT_MODE, and other modes may be added.)
(12) voID clear ( ): Delete entire image drawn on canvas
(13) voID clearAll (boolean isUndoable): Delete entire image drawn on canvas
(14) voID createTextBox (Point point): Function creating text box
(15) voID createTextBox (RectF rect, Editable text, Alignment alignment): Function creating text box
(16) boolean deleteSelectedObject( ): Method deleting selected object
(17) Bitmap getBackgroundImage( ): Return background image
(18) Bitmap getBitmap (boolean bOnlyIncludeForegroud): Method returning entire image data drawn in canvas view (CanvasView)
(19) byte[ ] getData( ): Method returning data of entire image drawn by user
(20) java.util.LinkedList<ImageInfo>getImageInfos( ): Function receiving information of image drawn by user as array of image information (ImageInfo) class
(21) int getMaxTextSize( ): Bring maximum size of Text
(22) int getMode( ): Return current mode set in canvas view (Canvas View)
(23) int getObjectID( ): Bring object ID of text box selected currently
(24) java.util.LinkedList<ObjectInfo>getObjectInfos( ): Function receiving information on all images drawn by user as array of object information (objectInfo) class
(25) PenSettinginfo getPenSettingInfo( ): Return pen setting information (PenSettingInfo) connected to CanvasView The filtering module 305 filters data on the pen pressure of the input with the electronic pen 500. In more detail, the pressure value on the pen pressure of the electronic pen 500 is determined by an electromagnetic sensor. In this case, the actual level value may be output. If, for example, the pen pressure has 128 steps ranging from 0 to 127, the sensor detects the pen pressure in the form of real number ranging from 0 to 127. Then the filtering module 305 performs data filtering based on the characteristic of the data on the pen pressure.

Additionally, the filtering module 305 performs filtering in consideration of the range of hand trembling. For example, when determining the hand trembling range in screen magnification, the filtering module 305 analyzes the difference between the data value measured before the zoom level and the chrono-correlation value. Likewise, when determining the filtering target in the pen pressure range, the filtering module 305 analyzes the object to which the pen pressure input is applied in the same manner.

Hereinafter, a description is provided of the operation of the control unit 110 wherein the smart terminal 100 contains the above described modules and operates as the input device of the computer 200.

Figure 3:
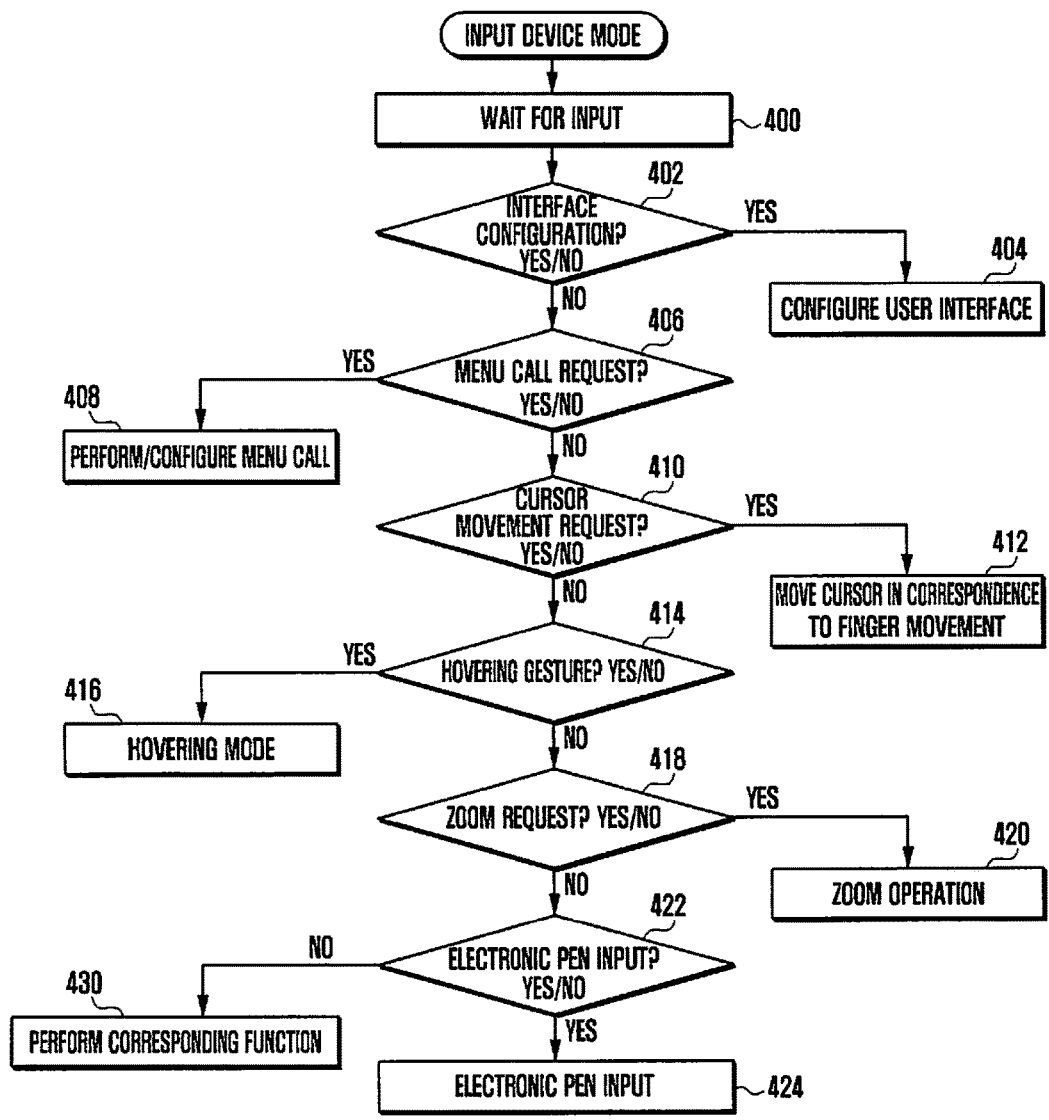
FIG. 3 is a flowchart illustrating a control procedure of a smart terminal operating as an input device of a computer, according to an embodiment of the present invention.

FIG. 3 is a flowchart illustrating a control procedure of a smart terminal operating as an input device of a computer, according to an embodiment of the present invention.

The embodiment of the present invention is directed to the case where the smart terminal 100 operates as an input device of the computer 200. The control unit 110 waits in the standby state at step 400. The standby state refers to the state of waiting for a certain input to the smart terminal 100 as a user input to the computer 200 in response to the user request.

The control unit 110 monitors to detect a user input and, if a user input is detected, at step 402, determines whether the user input is an user interface configuration request. The user interface configuration request is a request of selecting one of the right hand mode or the left hand mode in the user interface configuration mode, as described above. If the user input is the user interface configuration request, the control unit 110 configures the user interface at step 404. Since the user interface configuration procedure has been described above with reference to FIG. 2 and is also described below with reference to FIGS. 4A and 4B, a detailed description of the procedure is omitted herein.

If the user input is not the user interface configuration request, the control unit 110 determines whether the user input is a menu call request at step 406. If the user input is the menu call request, the procedure proceeds to step 408 and, otherwise, proceeds to step 410.

If the user input is the menu call request, the control unit 110 calls for the corresponding menu and configures or reconfigures the called menu. This step is performed in such a way that the control unit 110 receives the information input by the user through the input unit 102. The menu call procedure is described below with reference to FIG. 5.

In step 410, the control unit 110 determines whether the user input is a cursor movement. That is, the control unit 110 determines whether a mouse input for moving the cursor is detected. The cursor may be moved by means of a finger drag gesture, a hovering gesture of an electronic pen 500, and drag gesture of an electronic pen 500.

In the case of using the finger, the coordinates of the finger detected at the input unit 102 are updated according to the movement information generated by the input unit 102 such that the cursor moves on the screen of the computer 200 a distance corresponding to the displacement of the coordinates. That is, once a finger is recognized by the input unit 102 of the smart terminal 100, the cursor presented on the monitor of the computer 200 moves a distance in relation to the displacement of the coordinates of the finger. Here, it may be assumed that a mouse click event does not occur.

If the user input is not the cursor movement request at step 410, the control unit 110 determines whether the user input is a hovering gesture at step 414. If the user input is the hovering gesture, the control unit 110 controls the smart terminal 100 to enter a hovering mode at step 416.

The hovering mode is the operation mode used for detecting the presence or hovering behavior of an electronic pen 500 or for detecting that a button of the electronic pen 500 is pushed in the state that the electronic pen 500 maintains a certain distance from the input unit 102 within a predetermined distance range. If the electronic pen 500 is detected within the predetermined distance range without contact on the input unit 102, the input unit 102 detects the hover of the electronic pen 500 and generates a signal to the control unit 110. If the electronic pen 500 moves while in the hovering mode, i.e. if the electronic pen 500 moves in the air right above the input unit 102, the control unit 110 extracts movement vector information based on the coordinates provided by the input unit 102 and transfers the movement vector information to the computer 200, such that the cursor moves on the monitor of the computer 200 based onto the movement vector information. In order to accomplish this, the input unit 102 measures a voltage recognition difference occurring between the electronic pen 500 and the smart terminal 100 in eight (8) directions and provides the measurement result to the control unit 110. The control unit 110 checks all of the points and sends the corresponding coordinates to the computer 200.

The hovering mode may be configured such that the cursor on the computer 200 moves while the electronic pen 500 is in an up-state as if a mouse were moving normally on a flat surface. Further, the hovering mode may be configured such that a mouse click event occurs in response to a push on the button of the electronic pen 500. That is, if an input is made with the button of the electronic pen 500, the input unit 102 generates an input signal to the control unit 110. The control unit 110 sends the input signal to the computer 200 through the external interface 105 or the radio communication unit 104. The control unit 210 of the computer 200 detects the button input of the electronic pen 500 operating with the smart terminal 100 and regards the button input as a mouse click event.

Returning to FIG. 3, if the user input is not the hovering gesture at step 414, the control unit 110 determines whether the user input is a zoom request at step 418. If the user input is the zoom request, the control unit 110 performs a zoom operation at step 420.

The zoom request may be made in the same way as the zoom-in on the display unit 101 of the smart terminal 100. That is, the control unit 110 may determine whether the distance between two touch points increases based on the information provided by the input unit 102 to detect the zoom request. If the zoom request is detected, the smart terminal 100 generates a signal to the computer 200 in order for the video processing unit 203 to zoom in/out the data. The video processing unit 203 converts the data to video data so as to display the screen image on the monitor. The zoom in/out may be performed in a stepwise manner in correspondence to the movement distance of the zoom request. The zoom-in operation may be performed at a predetermined magnification ratio, e.g., 110%, 130%, 150%, 200%, 300%, and 500%, or in a stepwise manner, e.g., increasing by 5% or 10%. The zoom-out also may be performed in the same or similar manner.

If the user input is not the zoom request at step 418, the control unit 110 determines whether the user input is an electronic pen input at step 422. That is, the control unit 110 determines whether a drag of another touch is detected when that the electronic pen 500 has made a touch or whether the touch at a specific position is maintained over a predetermined time. If the user input is the electronic pen input at step 422, the control unit 110 operates in response to the electronic pen input at step 424. Otherwise, if the user input is not the electronic pen input, the control unit 110 performs a function corresponding to the user input at step 430.

At step 424, the electronic pen input corresponds to a drag and touch gesture or to a drag gesture. The drag gesture with the electronic pen 500 refers to a gesture in which the electronic pen 500 is dragged when being touched on the smart terminal 100. Since the electronic pen 500 is able to move when a button of the electronic pen 500 is clicked, a drawing action may be taken. If the button of the electronic pen 500 is pushed, this has the same effect as pushing a right button of a mouse and thus various functions can be configured by combining this action with keyboard manipulations.

Figure 4A:
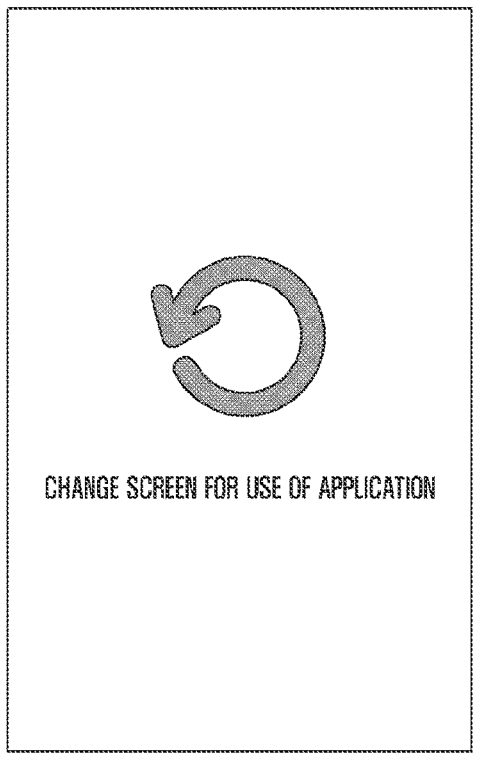
FIGS. 4A and 4B are diagrams of screen displays illustrating switching a pen grip mode at a user interface configuration screen of a smart terminal, according to an embodiment of the present invention.
Figure 4B:
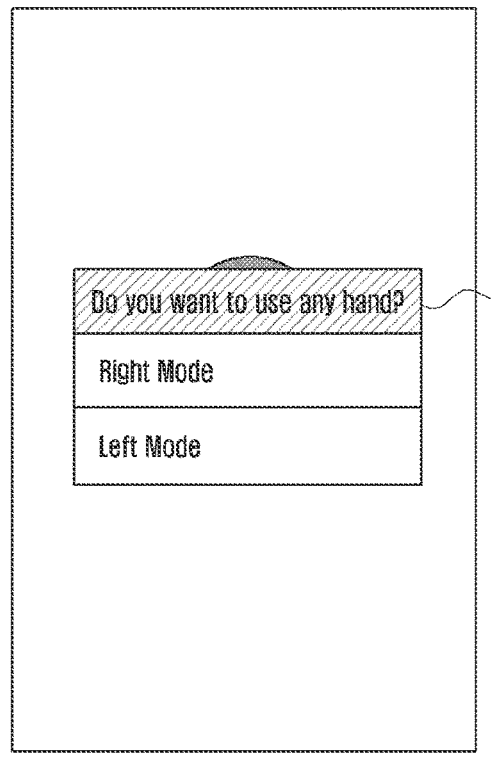

FIGS. 4A and 4B are diagrams of screen displays illustrating switching a pen grip mode at a user interface configuration screen of a smart terminal, according to an embodiment of the present invention.

Referring to FIG. 4A, a user interface configuration screen is shown where the user interface configuration module 303 is executed initially.

Referring to FIG. 4B, a screen display presenting a popup message 501, is shown where the popup message 501 prompts the user to select a pen grip mode. As shown FIG. 3B, the user may select one of the right mode, for a right hand grip, or the left mode, for a left hand grip. The user may select one of the hand grip modes with a finger, a pen touch input or a key input. When the hand grip mode is selected, the user interface configuration module 303 stores the selected mode in the memory 103 and, afterward, controls data display in the corresponding hand grip mode.

Figure 5A:
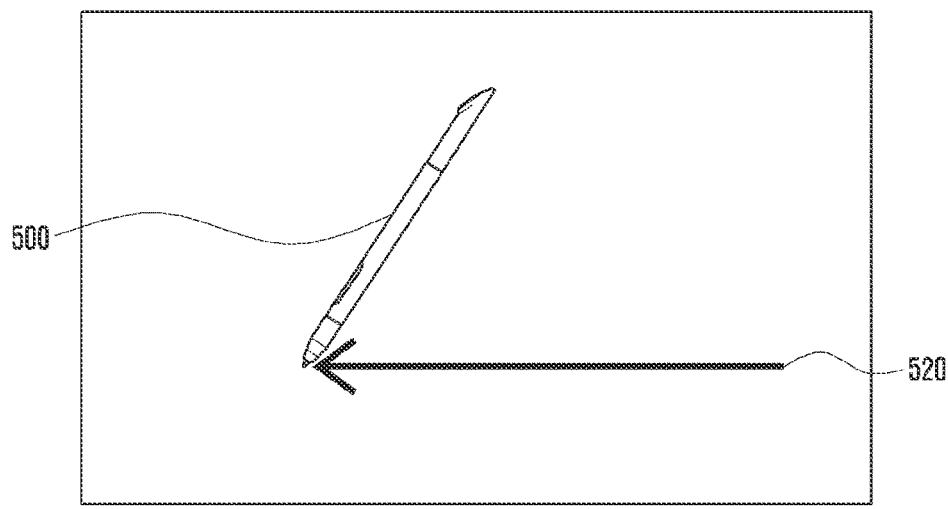
FIGS. 5A and 5B are diagrams of screen displays illustrating a menu calling procedure of a smart terminal, according to an embodiment of the present invention.
Figure 5B:
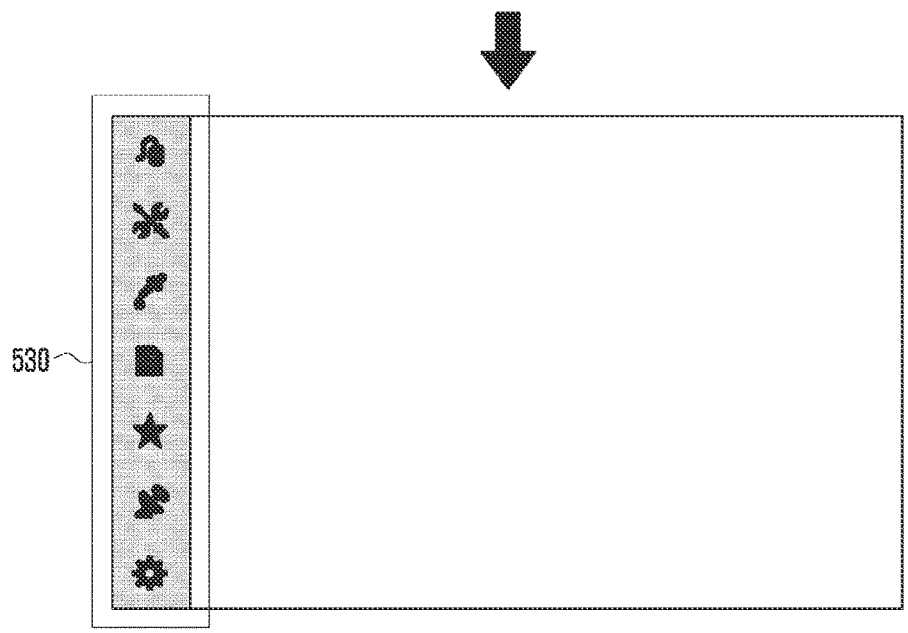

FIGS. 5A and 5B are diagrams of screen displays illustrating a menu calling procedure of a smart terminal, according to an embodiment of the present invention.

Referring to FIGS. 5A and 5B, a menu may be called in two ways. One way call a menu, is to draw a line 520 from right to left with the electronic pen 500, as shown in FIG. 5A. Another way in which a menu may be called is by selecting a specific key of the smart terminal 100. Accordingly, the manner in which the menu is requested may be preconfigured.

FIG. 5B shows a screen display of the called menu. A menu bar 530, including a number of menu icons, is presented at the left part of the screen. The smart terminal 100 may be configured such that the menu bar 530 disappears in response to an action of repressing the key used for calling the menu or in response to drawing a line.

The menu bar 530 may be configured as shown below in reference to FIGS. 6A to 6D. FIGS. 6A to 6D are diagrams illustrating configurations of the menu bar described in reference to FIG. 5.

Figure 6A:
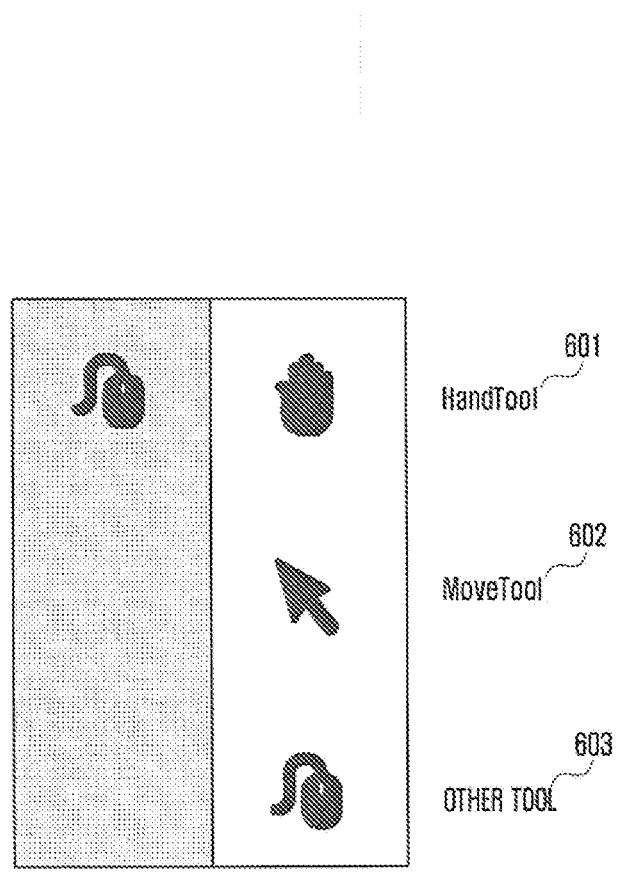
FIG. 6A is a diagram of a screen display illustrating menu items appearing when a mouse menu icon is selected on a menu bar of a smart terminal, according to an embodiment of the present invention.

FIG. 6A is a diagram of a screen display illustrating menu items appearing when a mouse menu icon is selected on a menu bar of a smart terminal, according to an embodiment of the present invention.

Referring to FIG. 6A, the mouse menu items include a hand tool 601 for use of a hand, a move tool 602 for use in moving an object, and other tool 603 for performing other actions. FIG. 6A shows the screen displayed by calling a menu for configuring the actions of the mouse when a photo edit or picture drawing application is executed in the computer 200. The photo edit or picture drawing application may be a graphics application program such as PHOTOSHOP.

Figure 6B:
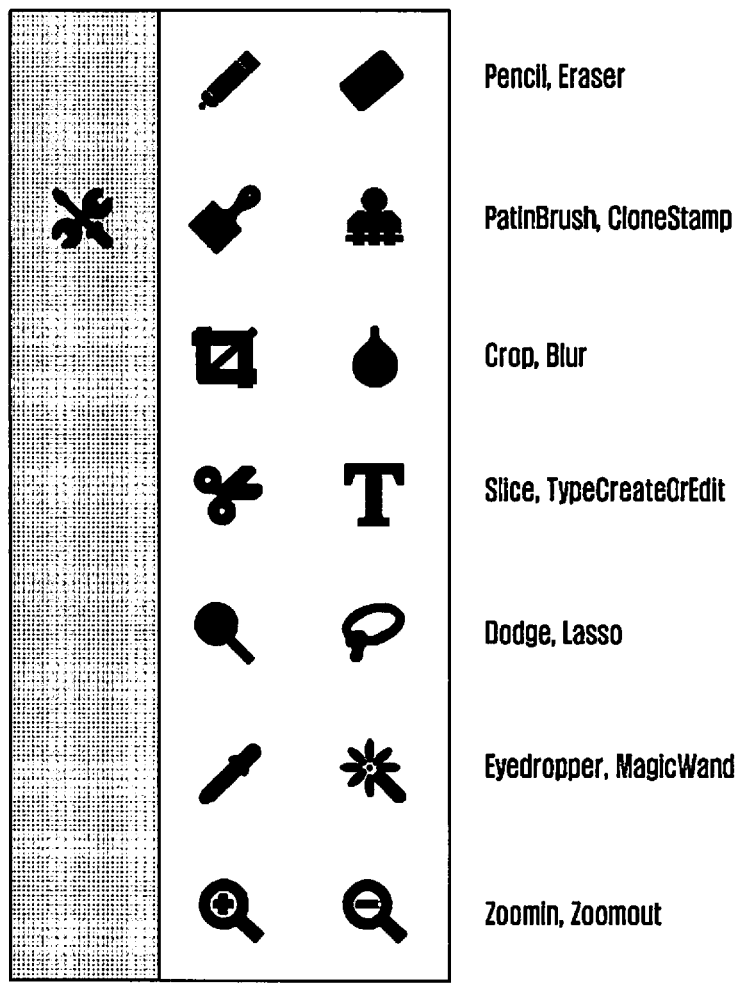
FIG. 6B is a diagram of a screen display illustrating menu items appearing when a settings menu icon is selected on a menu bar of a smart terminal, according to an embodiment of the present invention.

FIG. 6B is a diagram of a screen display illustrating menu items appearing when a settings menu icon is selected on a menu bar of a smart terminal, according to an embodiment of the present invention.

Referring to FIG. 6B, the settings menu items of a menu, e.g. a drawing tool menu, may be configured differently for user convenience or depending on the default values of the application program. In FIG. 6B, the settings menu items include a pencil tool, a drawing tool, a paint brush tool, a zoom-in tool, a zoom-out tool, etc.

Figure 6C:
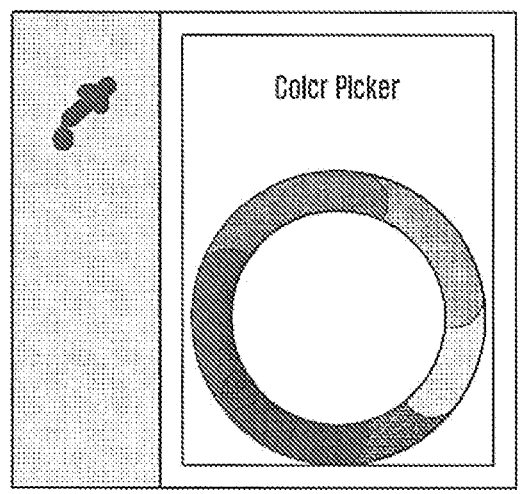
FIG. 6C is a diagram of a screen display illustrating menu items appearing when a color picker menu icon is selected on a menu bar of a smart terminal, according to an embodiment of the present invention.

FIG. 6C is a diagram of a screen display illustrating menu items appearing when a color picker menu icon is selected on a menu bar of a smart terminal, according to an embodiment of the present invention.

Referring to FIG. 6C, the color picker menu item is provided in the form of a color gradation chart with discrete color sections. The color gradation chart may be configured such that a foreground color and a background color are selected. In this case, the foreground color may be selected by maintaining a touch on the corresponding color for a predetermined time, and the background color may be selected by releasing a touch in a predetermined time or vice versa. It is also possible to configure the foreground and background colors by selecting the respective foreground and background screens directly.

Figure 6D:
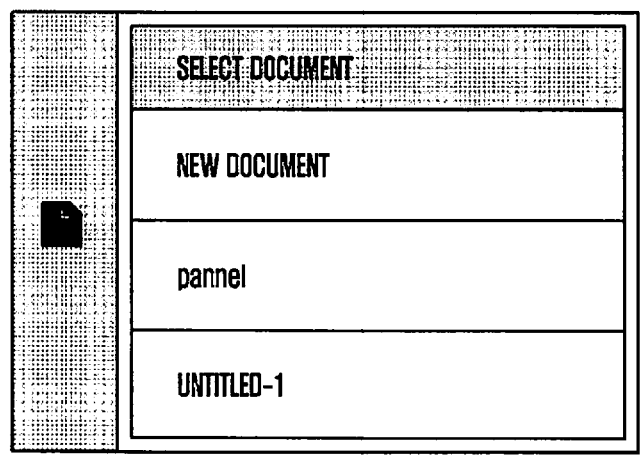
FIG. 6D is a diagram of a screen display illustrating menu items appearing when a document menu item is selected on a menu bar of a smart terminal, according to an embodiment of the present invention.

FIG. 6D is a diagram of a screen display illustrating menu items appearing when a document menu item is selected on a menu bar of a smart terminal, according to an embodiment of the present invention.

Referring to FIG. 6D, the document menu items include items for creating a new document and for selecting an existing document.

Figure 7A:
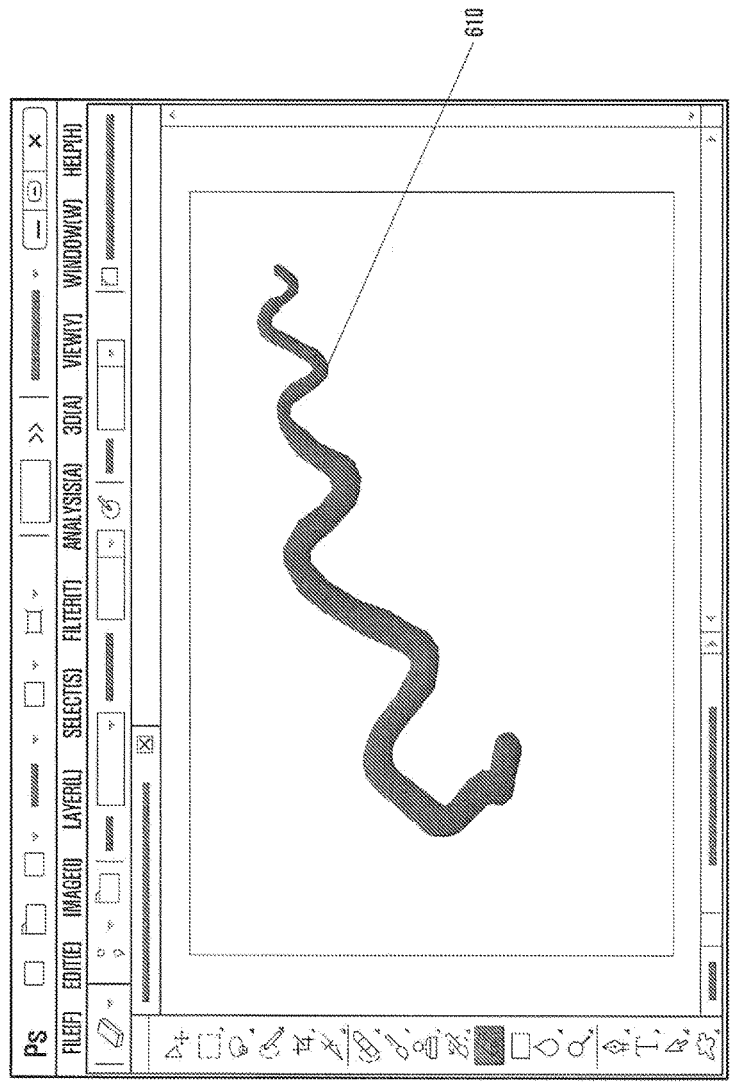
FIG. 7A is a diagram of a screen display illustrating an execution screen of a drawing application of a smart terminal, in which the boldness of a line changes based on a pen pressure, according to an embodiment of the present invention.

FIG. 7A is a diagram of a screen display illustrating an execution screen of a drawing application of a smart terminal, in which the boldness of a line changes based on a pen pressure, according to an embodiment of the present invention.

Referring to FIG. 7A, a screen display of the execution screen appearing when a drawing application program is executed is shown. While in a drawing application program, for example, it is possible to change a line property, such as boldness, based on the pen pressure applied in dragging the electronic pen 500.

The input unit 102 detects the pen pressure applied by the user along with the moving path of the electronic device 500 and transmits the information on the pen pressure and the moving path of the electronic pen 500 to the control unit 110. The control unit 110 then sends the computer 200 the information in the form of a real number as provided by the input unit 102 or converted into a predetermined format of level information. Then, the control unit 210 (of the computer) determines the boldness of the line based on the received information. When the received information is in the form of level information, the control unit 110 uses this information directly to determine the boldness of the line. When the received information is in the form of a real number, the control unit 110 first converts the received real number into level information, which is then used to determine the boldness of the line.

The line 610 may change in boldness according to the received information. That is the line 610 is drawn in a shape varying in accordance with the movement path and the pen pressure. In the example shown, the line 610 becomes bolder gradually as a result of the user moving the electronic pen 500 from right to left while diminishing the pressure gradually.

This means that the brush size is adjusted dynamically in accordance to the pressure applied to the electronic pen 500. It is preferred to specify the computation and components associated with the pen pressure in the platform of the computer 200 in consideration of the computation complexity and speed.

Additionally, it is possible to check the connection with a server or reestablish the connection using the menus of FIG. 7A.

Figure 7B:
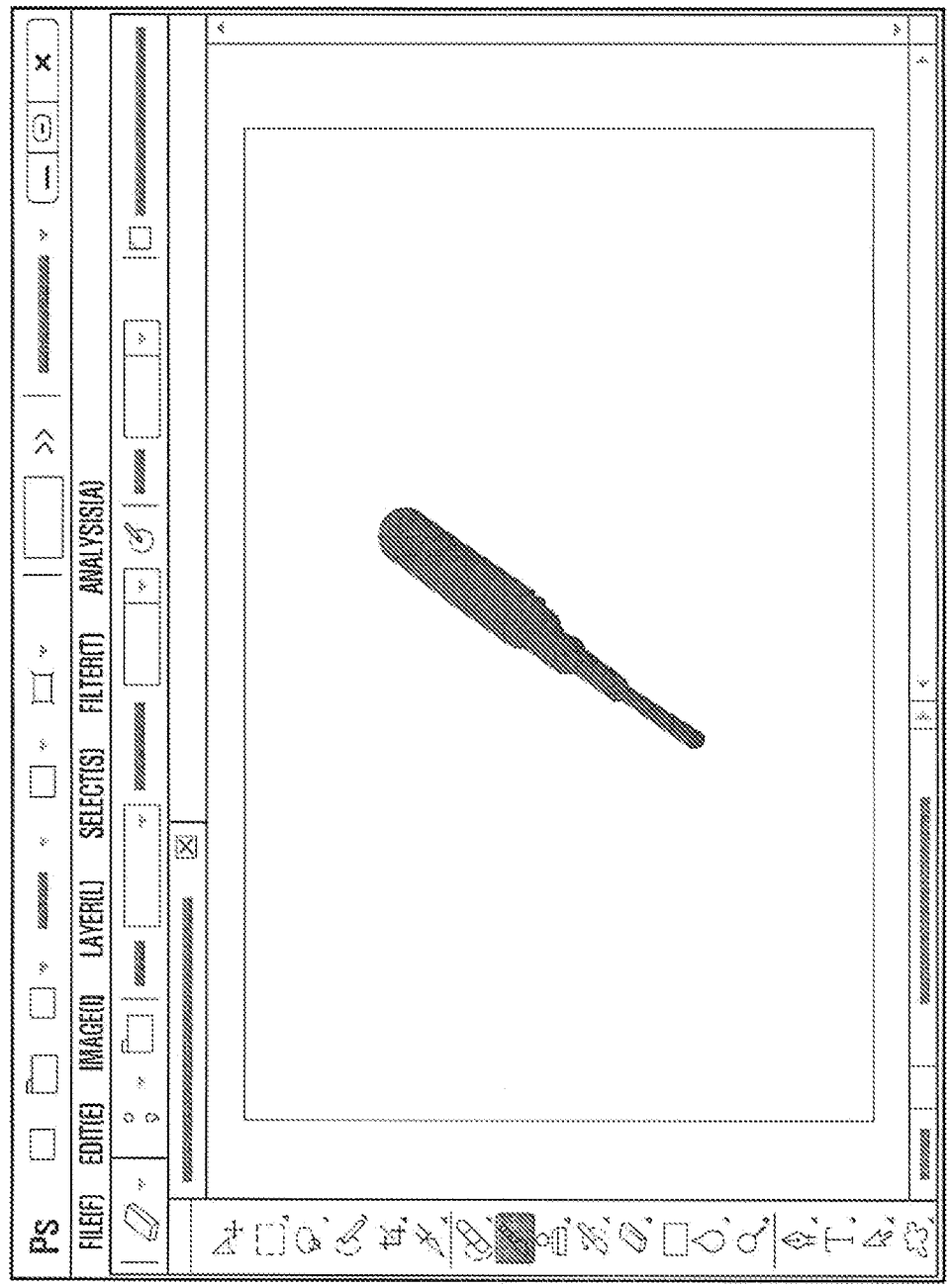
FIG. 7B is a diagram of a screen display illustrating dynamic drawing, according to an embodiment of the present invention.

FIG. 7B is a diagram of a screen display illustrating dynamic drawing, according to an embodiment of the present invention.

Referring to FIG. 7B, in the case of using the electronic pen 500, it is possible to support a dynamic draw action. The dynamic draw is a method for processing the line such that the ends of the line are shown naturally. It is preferred to specify the computation and components associated with the dynamic draw in the platform of the computer 200 in consideration of the computation complexity and speed.

Figure 8:
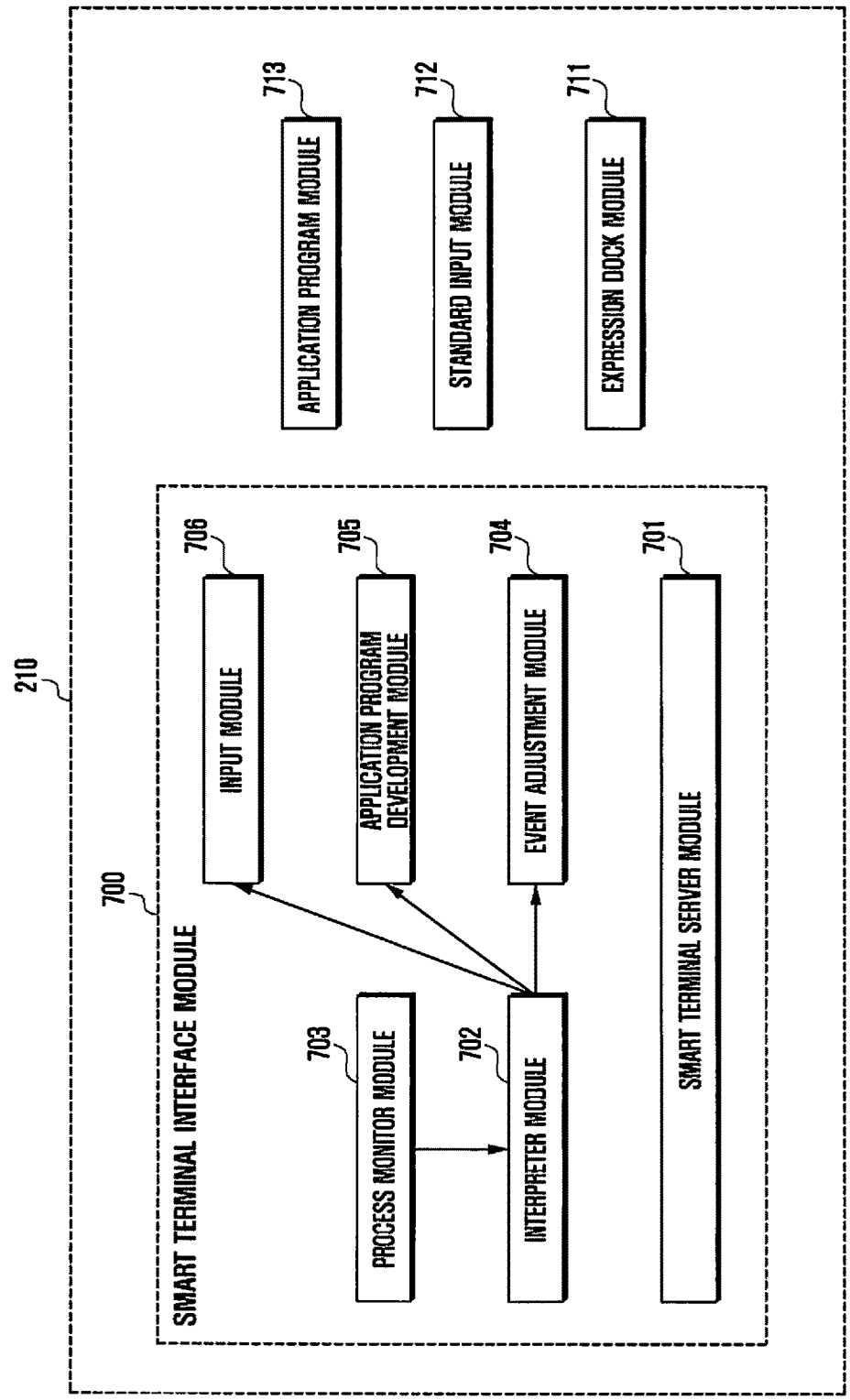
FIG. 8 is a block diagram illustrating a configuration of a control unit of a computer, according to an embodiment of the present invention.

FIG. 8 is a block diagram illustrating a configuration of a control unit of a computer, according to an embodiment of the present invention.

Referring to FIG. 8, the control unit 210 includes four function blocks. The function blocks of the control unit 210 include a smart terminal interface module 700 for receiving the input signal generated by the smart terminal 500. The function blocks of the control unit 210 also includes an expression dock module 711, a standard input module 712, and an application program module 713 for receiving the electronic pen-based input for supporting a graphic application such as PHOTOSHOP.

The smart terminal interface module 700 receives data from the smart terminal 100 operating on the Android OS and processes the data. The smart terminal interface module 700 also returns the data processing result to the smart terminal 100 and, if necessary, controls to display the data to the user. The smart terminal interface module 700 also checks the current foreground application and notifies the smart terminal 100 of the foreground application.

Hereinafter, descriptions are made of the sub-modules of the smart terminal interface module 700.

The smart terminal interface module 700 includes a smart terminal server module 701, an interpreter module 702, a process monitor module 703, an event handler module 704, an application program development module (Software Development Kit; SDK) 705, and an input module 706.

The smart terminal server module 701 distributes the data provided by the smart terminal 100 to the interpreter module 702, the process monitor module 703, the event handler module 704, the application program development module 705, and the input module 706; or transfers the data received from the interpreter module 702, the process monitor module 703, the event handler module 704, the application program development module 705, and the input module 706 to the smart terminal 100.

The interpreter module 702 interprets the data received from the smart terminal 100 to the format appropriate for the current process, i.e. the foreground application of the computer 200 and generates a corresponding command to other modules. The interpreter module 702 performs filtering and compensation on the input value in order for the user to maintain the best operation state.

The compensation performed by the interpreter module 702 may be classified into one of the three compensations as follows.

Hand trembling compensation: The electronic pen input is very sensitive and thus the detection value varies finely. Accordingly, if the mouse pointer trembles the pointer trembling is filtered to provide a stable value.

Coordinate compensation: The coordinates on x and y axes of different resolutions are adjusted to secure a regular operation environment.

Pen pressure compensation: If a pen pressure level value is input, this value may modify the boldness of the electronic pen input to match the input pen pressure level value.

The process monitor module 703 checks the foreground application to assist interpretation of the received data. If the foreground application is changed, the process monitor module 703 sends the name of the new foreground application to the smart terminal 100 such that the smart terminal changes the user interface (UI) and operation mode for the new foreground application.

In the case that the OS of the computer 200 is Windows, the process monitor module 703 may observe the foreground application using 'GetForegroundWindow' API. That is, the following function is called and is executed:

HWND WINAPI GetForegroundWindow(void);

The above function is Win32API function and thus, if the C# program is used, a DLL file has to be imported using the following declarative statement:

[DllImport("user32.dll", CharSet=CharSet.Auto, ExactSpelling=true)] public static extern IntPtr GetForegroundWindow( );

The application program development module 705 is a kit for development of a certain application program. The application program development module 705 is described with reference to PHOTOSHOP. That is, the following description is made under the assumption that the application program development module 705 is a PHOTOSHOP application program development module. The PHOTOSHOP development module is a development kit for providing developers and users with an environment optimized for PHOTOSHOP.

The PHOTOSHOP development module is referred to as 'Photoshop Connection SDK' and is provided for control at an external device such as smart terminal. However, the smart terminal 100, according to an embodiment of the present invention, uses a software development kit Connection SDK through internal socket communication at the computer 200 for covering universal tablet functions as well as PHOTOSHOP. The software development kit connection may be provided in a common programming language such as JAVA and is used to transfer a user input value to the application program such as PHOTOSHOP.

If the received data is interpreted as a simple mouse or keyboard control operation, the event handler module 704 and the input module 706 control the mouse or the keyboard input.

First, a description is made of the mouse control. The mouse control is implemented through programming, as follows, using a 'mouse_event' function:

VOID WINAPI mouse_event(
_in DWORD dwFlags,
_in DWORD dx,
_in DWORD dy,
_in DWORD dwData,
_in ULONG PTR dwExtraInfo)
);

The 'mouse_event' for mouse control is a Win32API function and thus a DLL must be imported using the declarative statement as follows for use in a C# program:

[DllImport("user32.dll")]
public static extern void mouse_event(
int dwFlags,
int dx,
int dy,
int cButtons,
int dwExtraInfo)
);

The above shown factors are as follows:
(1) DWORD dwFlags: The mouse event value is defined as follows. —MOUSEEVENTF_ABSOLUTE (0x8000): Used when the mouse position is changed. Although dx and dy factors are applied, it is not applicable if the event flag and MOCE flag are not applied.

(2) MOUSEEVENTF_LEFTDOWN (0x0002): Push mouse left button
(3) MOUSEEVENTF_LEFTUP (0x0004): Release mouse left button
(4) MOUSEEVENTF_MIDENTIFIERDLEDOWN (0x0020): Push mouse center button
(5) MOUSEEVENTF_MIDENTIFIERDLEUP (0x0040): Release mouse center button
(6) MOUSEEVENTF_MOVE (0x0001): Move mouse
(7) MOUSEEVENTF_RIGHTDOWN (0x0008): Push mouse right button
(8) MOUSEEVENTF_RIGHTUP (0x0010): Release mouse right button
(9) MOUSEEVENTF_WHEEL (0x0800): Move mouse wheel. Value is assigned to dwData.
(10) MOUSEEVENTF_XDOWN (0x0080): Push X button
(11) MOUSEEVENTF_XUP (0x0100): Release X button
(12) DWORD dx: Assign x coordinate. However, this is not applicable if the MOUSEEVENTF_ABSOLUTE and MOUSEEVENTF_MOVE flags are not assigned.
(13) DWORD dy: Assign y coordinate. Like x coordinate, this is not applicable if the MOUSEEVENTF_ABSOLUTE and MOUSEEVENTF_MOVE flags are not assigned.
(14) DWORD dwData: Assign value of mouse wheel. The mouse has a forward roll effect if this value increases to be greater than the current value or a backward roll effect if this value decreases to be less than the current value.
(15) ULONG_PTR: It is possible to assign a function pointer for executing additional operations.

When the mouse moves, it is necessary to divide 65535 by horizontal/vertical resolutions and multiply the position of the mouse cursor to take the resolution of the actual monitor screen as the reference point. Assuming that the screen resolution is 1024*768, the position of the mouse cursor can be calculated as Equation (1). Here, * denotes multiplication.

$$X=(65535/1024)*x$$

$$Y=(65535/768)*y \quad (1)$$

Next, a description is made of the keyboard control. The keyboard control is implemented through programming, as follows, using a 'keybd_event' function:

VOID WINAPI keybd_event(
_in BYTE bVk,
_in BYTE bScan,
_in DWORD dwFlags,
_in ULONG PTR dwExtraInfo
);

The 'keybd_event' for keyboard control is a Win32API function and thus a DLL has to be imported using the declarative statement as follows for use in C# program:

[DllImport("user32.dll")]
public static extern void Keybd_event(
byte vk,
byte scan,
int flags,
ref int extrainfo)
);

The above shown factors are as follows:
(1) BYTE bVk: A virtual key code value. This value is designated in the range from 0x00 to 0xFF. However, 0x00 and 0xFF are reserved values.

(2) BYTE bScan: A hardware scan code. This code is not used currently.
(3) DWORD dwFlags: A keystroke flag.
REYEVENTF_EXTENDEDKEY (0x0001): Keydown.
KEYEVENTF_KEYUP (0x0002): Key-up.
ULONG_PTR: A function pointer may be designated for additional operations.

A description is made of the pen pressure adjustment. In the smart terminal 100, the pen pressure is implemented such that the brush size is dynamically adjusted according to the pressure applied by the electronic pen 500. The pen pressure is input as an integer value in the range from 0 to 1 and measured in percentage. The pen pressure is implemented with to following factors in the smart terminal:

(1) Pen pressure sensitivity: This determines how quickly the change of the pen pressure is applied.

(2) Pen pressure upper limit minimum value: This is the minimum pen pressure value required for an increase in the brush size.

(3) Pen pressure lower limit maximum value: This is the minimum pen pressure value required for a decrease in the brush size.

(4) Pen pressure weight: This is a variable value for adjusting the next pen pressure upper and lower limit values.

For example, if the pen pressure upper limit minimum value is 70 and the pen pressure lower limit maximum value is 30 and the pen pressure weight is 5, the operation of increasing the brush size is performed by increasing the pen pressure value in a stepwise manner starting from the initial value of 70 and then increasing the brush size upwards in increments of 5, i.e. from 70, to 75, to 80, etc. In contrast, the operation of decreasing the brush size is performed by decreasing the pen pressure value in a stepwise manner starting from the initial value of 30 and then decreasing the brush size downward in increments of 5, i.e. from 30, to 25, to 20, etc.

The pen pressure has 0 to 15 stepwise levels on the basis of an initial value of the brush size of 10. This is for the purpose of preventing the brush size from increasing or decreasing excessively.

Hereinafter, a description is made of the dynamic draw. The dynamic draw compensates the finish of a stroke in the smart terminal 100. It predicts a final movement path of the brush to draw finish forcibly. That is, the drawing is completed through an automatic rendering of the subsequent part of the drawing based on a prediction of a movement path of the brush. The predicted movement path is predicted by computing the instantaneous rate of change (slope of tangential line) of a stroke using the coordinates of the last few input values (e.g. the 'lastcoordinates' and 'second lastcoordinates' as shown in Equation (2)) and acquiring a linear function on the estimated path based on the instantaneous rate of change. The final equation acquired through this method is shown as Equation (2).

$$\begin{aligned} lastcoordinates &= (x_0, y_0) \\ \text{second } lastcoordinates &= (x_1, y_1) \\ f(x) &= \frac{y_0 - y_1}{x_0 - x_1} \times (x - x_0) + y_0 \end{aligned} \quad (2)$$

Using Equation (2), x increments by +1 from $x_0$ five times to obtain (x', y') and then draws at corresponding coordinates while adjusting the brush size.

Finally, a description is made of the hand trembling. In the case of the hand trembling compensation, the hand trembling is compensated using the median value acquired by averaging the depth ratio designated from 50 in Fibonacci sequence Fn (1<=n<=50) with the input values. The Fibonacci sequence is expressed as Equation (3).

$$\begin{aligned} F_n = (&12586269025, 7778742049, 4807526976, \\ &2971215073, 1836311903, 1134903170, \\ &701408733, 433494437, 267914296, 165580141, \\ &102334155, 63245986, 39088169, 24157817, \\ &14930352, 9227465, 5702887, 3524578, 2178309, \\ &1346269, 832040, 514229, 317811, 196418, \\ &121393, 75025, 46368, 28657, 17711, 10946, 6765, \\ &4181, 2584, 1597, 987, 610, 377, 233, 144, 89, 55, 34, \\ &21, 13, 8, 5, 3, 2, 1, 0) \end{aligned} \quad (3)$$

Using the Fibonacci sequence, the hand trembling compensation can be performed through Equation (4).

$$X = \frac{\sum_{i=0}^{n}(F_n \times x_n)}{\sum_{i=0}^{n} F_n}, \quad (4)$$

$$Y = \frac{\sum_{i=0}^{n}(F_n \times y_n)}{\sum_{i=0}^{n} F_n}$$

In using the smart terminal 100 as the input device of the computer 200, it is necessary to configure the application programs running on the computer 200 appropriate for the user's circumstance. Most application programs provide menus for configuring the settings appropriate for the user's circumstance. Likewise, there is a need of a method for configuring the menus to be presented on the screen of the smart terminal 100 and the display device such as a monitor of the computer 200.

In order to assist in menu configuration, it is typical to display a menu configuration window to the user. According to an embodiment of the present invention, the configuration window is provided as follows.

Figure 9A:
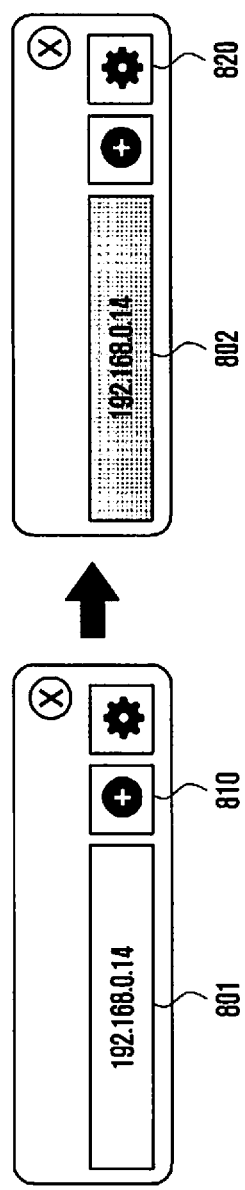
FIG. 9A is a diagram of a menu configuration window presented by a smart terminal or a computer, according to an embodiment of the present invention.
Figure 9B:
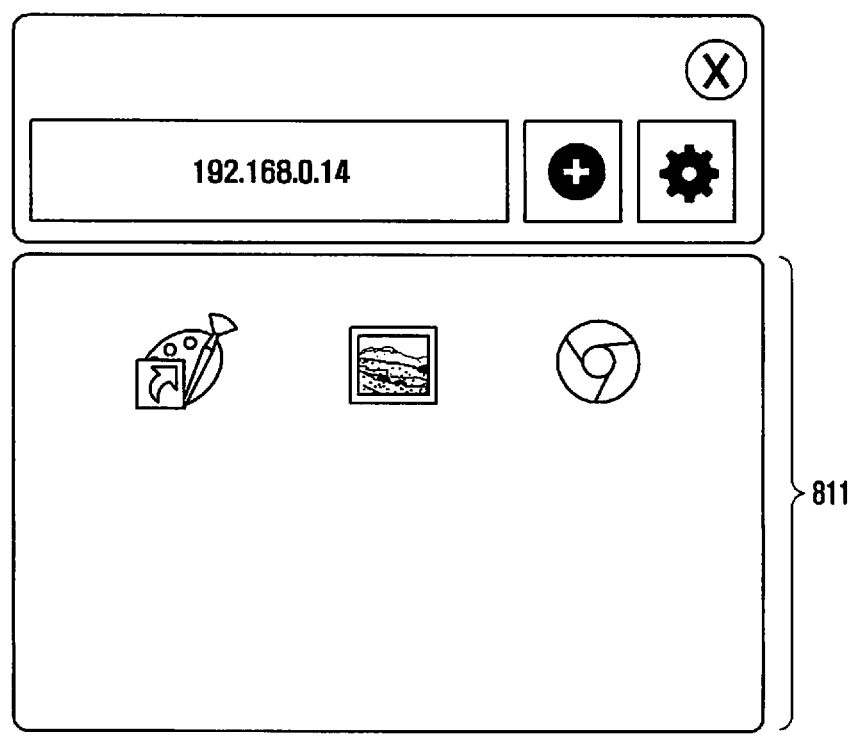
FIG. 9B is a diagram of a menu configuration window illustrating the registration of an icon with an expression dock, according to an embodiment of the present invention.

The configuration window is provided with menu items capable of registering icons with an expression dock 811, as shown in FIG. 9B, and configuring and feeding back the settings associated with the menu items to the smart terminal 100. The configuration window also makes it possible to check the connection state between the computer 100 and the smart terminal 100. The configuration window may be configured so as to be activated by selecting a tray icon or toothed wheel icon which is used typically to indicate a configuration menu.

FIG. 9A is a diagram of a menu configuration window presented by a smart terminal or a computer, according to an embodiment of the present invention.

Referring to FIG. 9A, the configuration window may be presented in two different states. The initial state is one such that a connection between the smart terminal 100 and the computer 200 has not been established. The second state is one which occurs when a connection is requested, maintained, or established between the smart terminal 100 and the computer 200. In the unconnected state, the address box is reflected by color 801, in the connected state the address box changes from color 801 to color 802.

The configuration window is provided with an add button 810 for use in registering an icon with the expression dock 811 and a settings menu button 820 for displaying a settings menu window.

FIG. 9B is a diagram of a configuration window illustrating the registration of an icon with an expression dock, according to an embodiment of the present invention.

Referring to FIG. 9B, if the add button 810, marked with the + symbol, is selected to register an icon with the expression dock 811, the expression dock 811 is activated as shown in FIG. 9B. An icon may be registered with the expression dock 811 by dragging the corresponding icon and dropping it in the expression dock 811. Also, the icon may be deleted using a menu item appearing when clicking the right mouse button on the corresponding icon. It is preferred that the expression dock 811 limits the number of icons for user convenience. This is because too many icons may cause user complexity and degrade the system performance. Accordingly, the expression dock 811 may be configured such that the number of icons that can be registered is limited to 6 or 10, for example.

In this way, a user's favorite menus and programs may be accessed using the icons registered with the expression dock 811. In the case of a design professional, the designer may search the Internet for the data or use more than one application program during his/her work. While performing such work using a tablet, the designer may have to use the smart terminal 100 as a tablet, the electronic pen 500 as an input tool of the smart terminal, and a mouse alternately. In such a situation, using the smart terminal 100 and the electronic pen 500 as the input tool of the computer 200 makes it possible to simplify the input operation.

The expression dock 811 may be configured to be hidden at one of the left, right, top, or bottom sides of the screen and shown in response to a swipe gesture or a selection of the add button 810.

If the settings menu button 820 is selected when the smart terminal 100 is connected to the computer 200, other selectable menu items are presented.

Figure 9C:
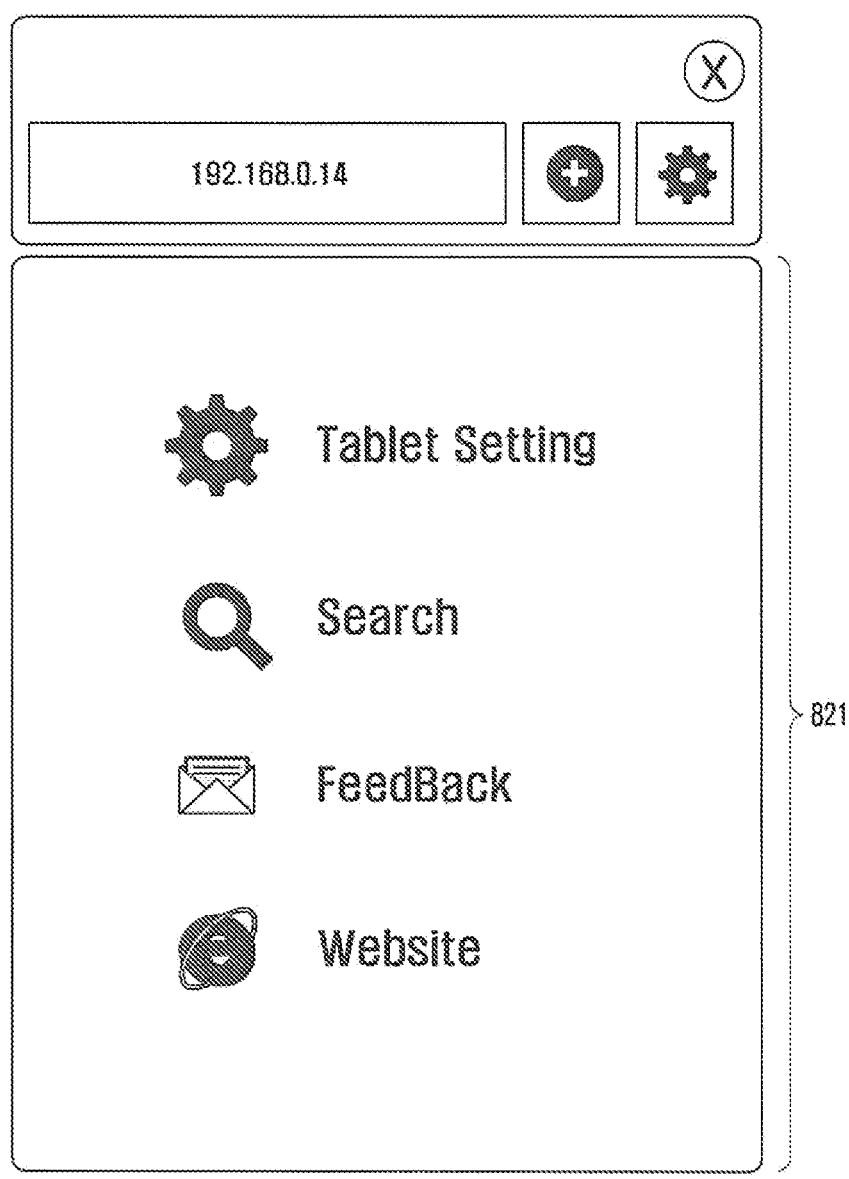
FIG. 9C is a diagram of a settings menu window, according to an embodiment of the present invention.

FIG. 9C is a diagram of a settings menu window, according to an embodiment of the present invention.

Referring to FIG. 9C, if the settings menu button 820 is selected, the settings menu window 821 appears, the setting menu window includes tablet setting, search, feedback, and website items.

If the user selects the tablet setting item in the settings menu window 821, a setting window for the tablet, i.e. the smart terminal 100, appears. The tablet setting window is described below with reference to FIG. 9D.

Figure 9D:
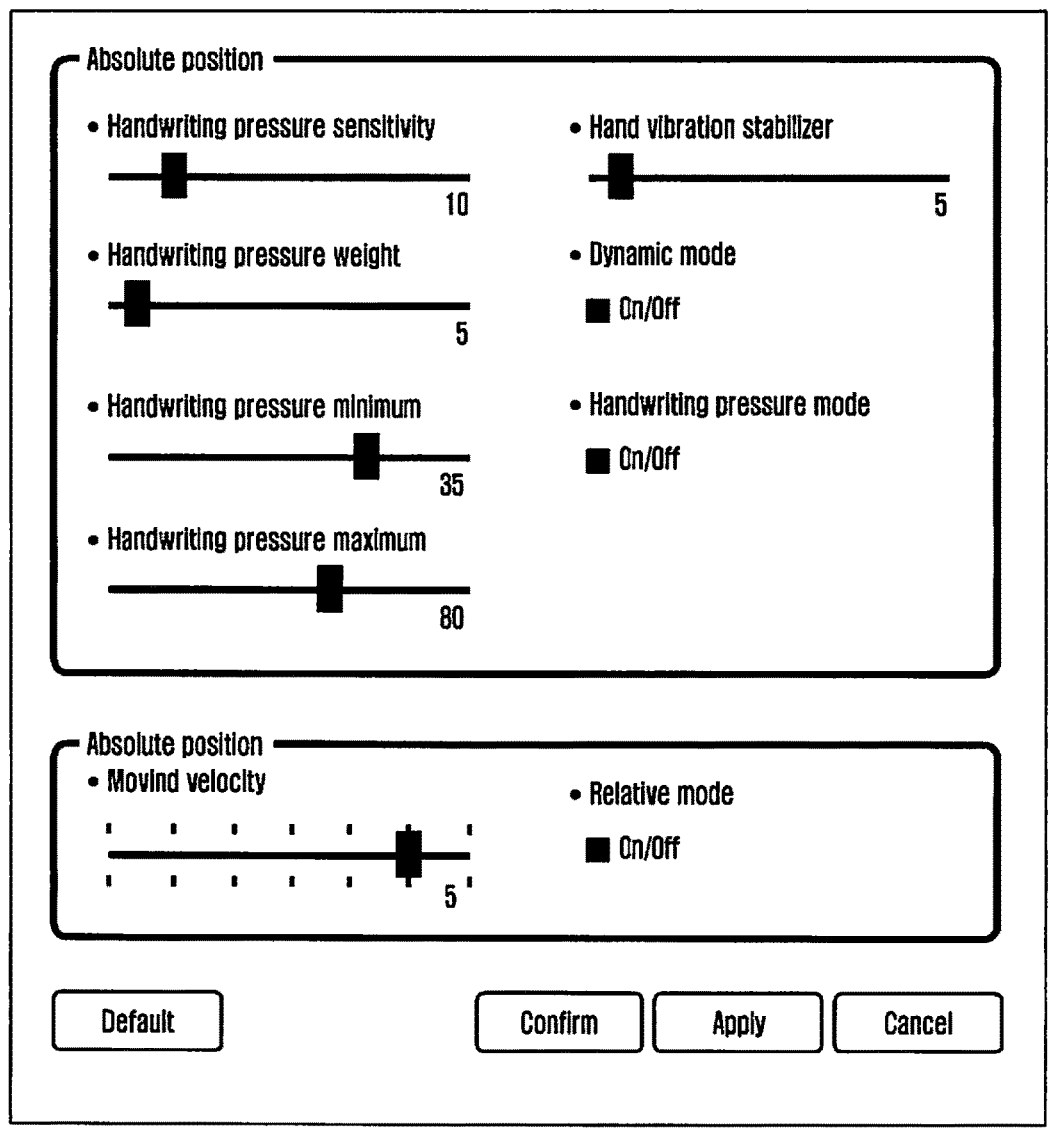
FIG. 9D is a diagram of a tablet setting menu window, according to an embodiment of the present invention.

FIG. 9D is a diagram of a tablet setting window, according to an embodiment of the present invention.

Referring to FIG. 9D, the input parameters related to the smart terminal 100 can be adjusted in the tablet settings menu window. The tablet settings menu window makes it possible to adjust certain parameter ranges and turn on/off certain operation modes. In a certain case, it is possible to prompt the user to input information. The tablet setting items of the tablet settings window can be summarized as follows:

(1) Handwriting pressure sensitivity: handwriting pressure sensitivity (2) Handwriting pressure weight: handwriting pressure weight (3) Handwriting pressure minimum: handwriting pressure lower limit (4) Handwriting pressure maximum: handwriting pressure upper limit (5) Hand vibration stabilizer: hand tremble compensation (6) Dynamic mode: Dynamic Draw on/off (7) Handwriting pressure mode: handwriting on/off Generally, a smart terminal differs from a dedicated tablet in respect to shape. For example, the smart terminal is typically smaller than the tablet in size. Since the smart terminal is designed with a focus on the portability, it differs from the dedicated tablet in many respects including design.

In cases where the smart terminal is designed to have a gently curved rear case, it may wobble or slip in performing a drawing on the smart terminal. As a result, this makes using the smart terminal as an input means inconvenient. Also, since the smart terminal is small in size, as compared to the dedicated tablet, it is difficult for a user to manipulate the smart terminal with his hands. A solution to this problem is to provide a dock for the smart terminal.

Figure 10A:
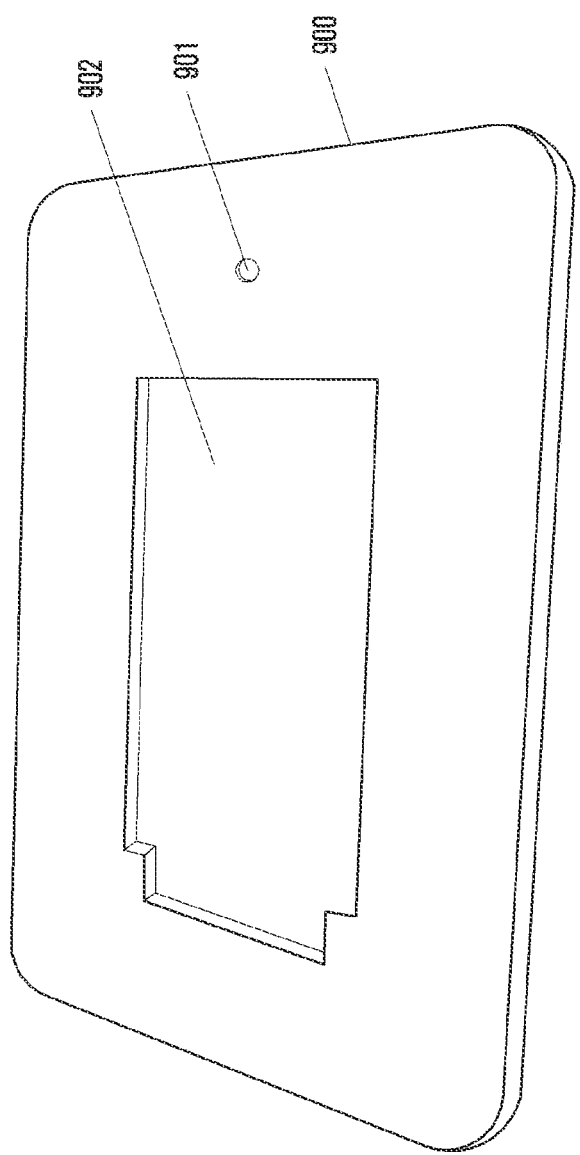
FIGS. 10A-10C are diagrams of a dock for docking the smart terminal, according to an embodiment of the present invention.
Figure 10B:
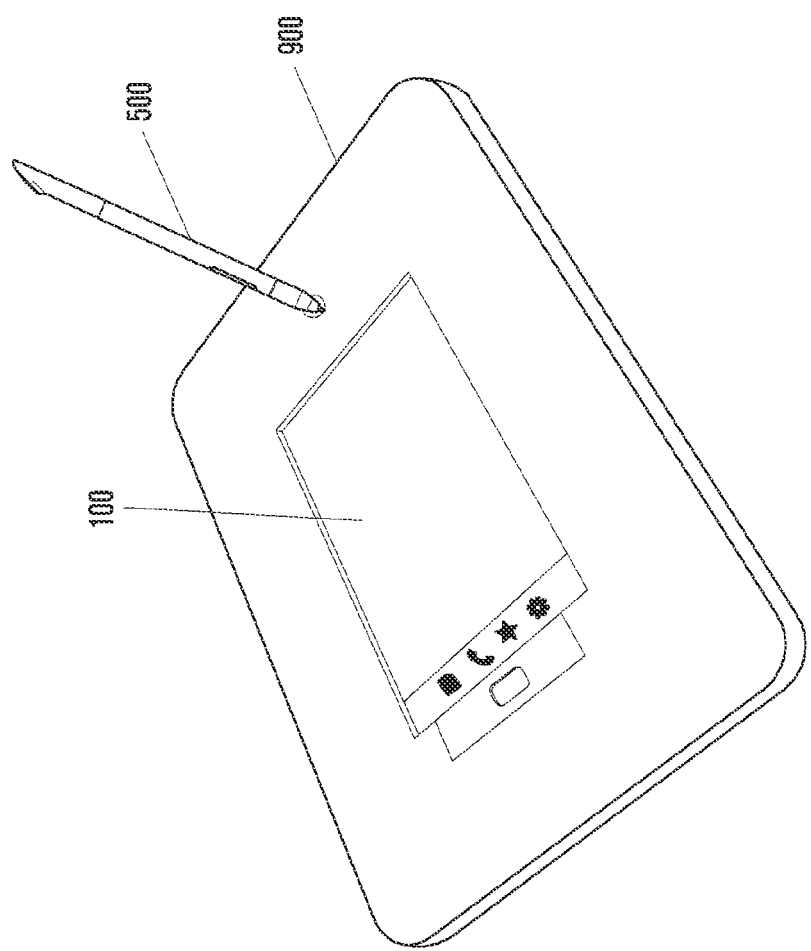
Figure 10C:
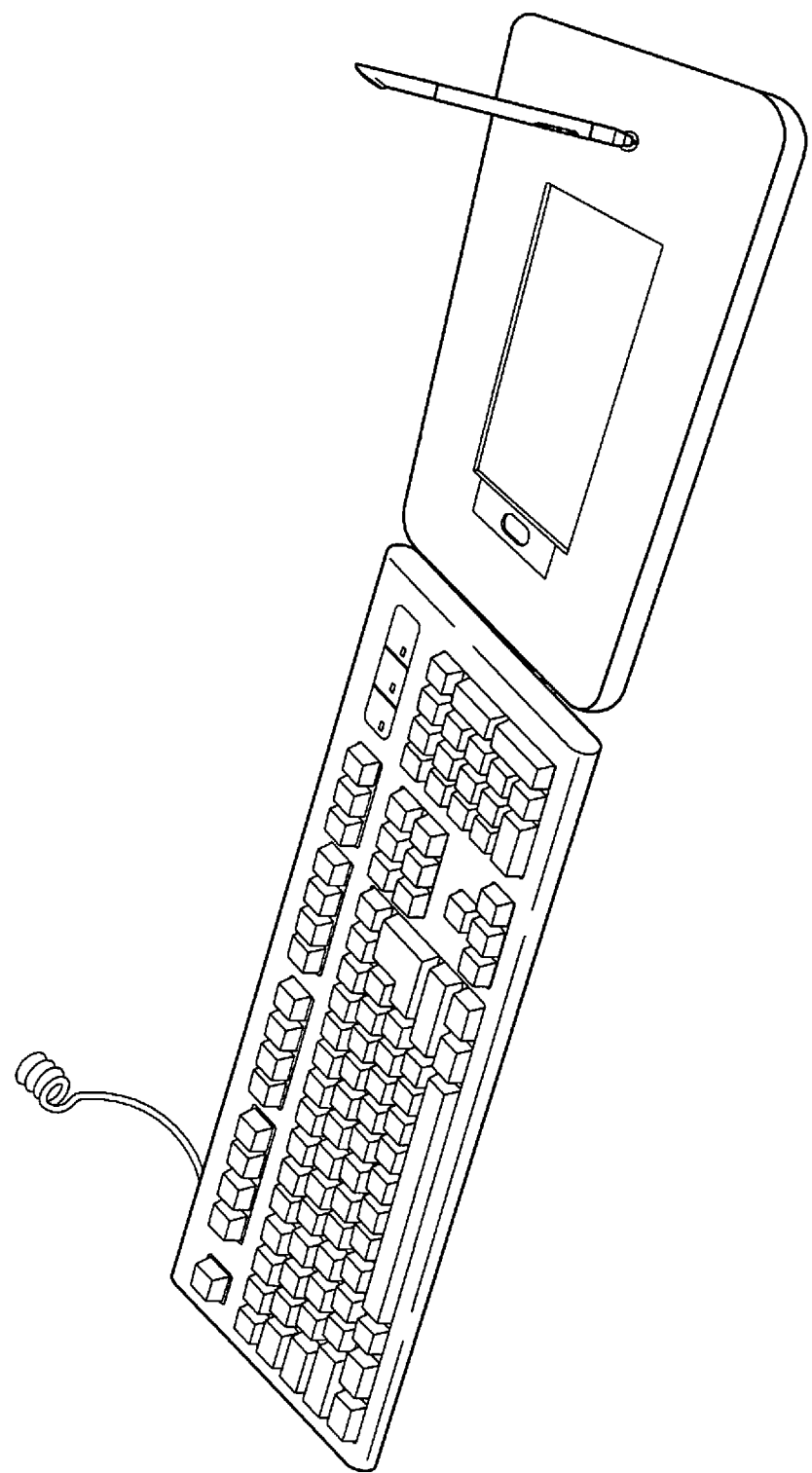

FIG. 10A-10C is a diagram of a dock for docking a smart terminal, according to an embodiment of the present invention.

Referring to FIG. 10A, the dock 900 has a smart terminal mounting space 902 for situating the smart terminal 100. The dock 900 also has a pen holding hole 901 for situating the electronic pen 500 used as an input tool of the smart terminal 100. The dock 900 is designed to tightly surround the smart terminal 100 and hold the electronic pen. The dock 900 may be designed in various shapes, e.g. circle, triangle, diamond, and other polygons, with various patterns depending on the user's taste.

Referring to FIG. 10B, the smart terminal 100 is situated in the smart terminal mounting space 902, and the electronic pen 500 is held in the pen holding hole 901. The dock 900 may have a space for containing a charging code for use in charging the smart terminal 100 and, in the case that the smart terminal 100 is connected to the computer through a cable, a space may be available for the connection cable used for communication between the smart terminal 100 and the computer 200.

Referring to FIG. 10C, the dock 900 is arranged aside a keyboard as one of the main input devices of the computer 200, the dock 900 situating the smart terminal 100 and holding the electronic pen 500 thereon. Typically, the working environment may be arranged in the same or similar order as shown in FIG. 10C.

As described above, the computer input system of the present invention uses the smart terminal 100 with an electronic pen 500 as the input device of the computer 200, such that the user is capable of providing input to the computer 200 using with the smart terminal 100 instead of an expensive tablet input device.

As described above, the smart terminal-assisted input apparatus and method of the present invention is advantageous in using a smart terminal to make various inputs to a computer. Using the smart terminal as the input device of the computer, it is possible to reduce a user's economic burden of purchasing an extra input device. The smart terminal-assisted input apparatus and method of the present invention makes use of the superior computing power of the computer and the diverse input schemes of the smart terminal, thereby improving the usability of the smart terminal.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of a computer for using a mobile terminal as an input device, the method comprising:

identifying, by the computer, a foreground application among two or more running applications on the computer;

detecting, by the computer, whether the foreground application is changed;

transmitting, by the computer, information of the changed foreground application on the computer, to the mobile terminal via a predetermined communication mode established between the computer and the mobile terminal, when the foreground application is changed;

receiving, from the mobile terminal, input to the mobile terminal from an electronic pen via the predetermined communication mode;

interpreting the input according to the foreground application;

converting the interpreted input to an input signal according to the foreground application;

controlling the foreground application with the input signal, to execute an operation corresponding to the input signal; and if the input signal relates to drawing a line, receiving information on coordinates of the line and pen pressure, changing a boldness of the line in accordance with the received pen pressure, and compensating for trembling of a hand holding the electronic pen using a Fibonacci sequence, wherein the input, from the mobile terminal, includes movement vector information of the electronic pen, and the input signal is a keyboard or mouse input signal.

2. The method of claim 1, wherein the communication mode is one of Universal Serial Bus (USB) mode, Wireless Local Area Network (WLAN) mode, and Bluetooth mode.

3. The method of claim 1, further comprising predicting, when the input signal relates to drawing the line, final movement path of the electronic pen to draw an end point forcibly.

* * * * *